United States Patent [19]

Burton et al.

[11] 4,355,269

[45] Oct. 19, 1982

[54] MOTOR HEATING CONTROL WITH INTERLOCKED DUAL ISOLATING SWITCHES

[75] Inventors: Lawrence A. Burton, Oconomowoc; David T. Rollay, Franklin; Walter J. Lukitsch, New Berlin, all of Wis.

[73] Assignee: Allen-Bradley Company, Milwaukee, Wis.

[21] Appl. No.: 285,962

[22] Filed: Jul. 23, 1981

[51] Int. Cl.³ .............................................. H02P 7/00
[52] U.S. Cl. .................................... 318/436; 361/339
[58] Field of Search ........................ 361/339, 25, 343; 318/436; 200/147 R, 50 B, 50 C

[56] References Cited

U.S. PATENT DOCUMENTS

| | | | |
|---|---|---|---|
| 2,338,518 | 1/1944 | Koch | 318/558 |
| 3,445,743 | 6/1969 | Blair | 318/436 |
| 3,582,712 | 6/1971 | Blair | 318/473 |
| 3,717,804 | 2/1973 | Dikinis et al. | 318/436 |
| 3,774,096 | 11/1973 | Hann | 318/436 |
| 3,896,353 | 7/1975 | Burton et al. | 361/339 |
| 4,195,324 | 3/1980 | Waltz | 361/25 |

OTHER PUBLICATIONS

Bulletin 1500 Instructions, Allen-Bradley Co. Publication 1500-5.0 – Sep. 1976.

Primary Examiner—Ulysses Weldon
Attorney, Agent, or Firm—Quarles & Brady

[57] ABSTRACT

A motor heating control for retrofit applications has an enclosure with power supply terminals and motor heating output terminals. Inside an upper compartment is a first two-pole isolating switch which couples power from the supply terminals through a step-down transformer and a rectifier to one side of a motor heating contactor in the lower compartment. The other side of the motor heater contactor is coupled through fuses and a second two-pole isolating switch in the lower compartment to the motor heating output terminals. An operating handle outside the lower compartment is mechanically interlocked to both isolating switches so that the door of the enclosure cannot be opened without disconnecting both the motor heating power source and the electrical motor from the motor heating control. The motor heating contactor is also electromechanically interlocked to the door interlock mechanism so that the operating handle cannot be moved to its open position until the motor heating contacts are opened. When the motor heating contacts are closed, current will be supplied to at least one motor winding to maintain a temperature of 5°–10° F. above the ambient and prevent condensation in the windings of a motor.

6 Claims, 6 Drawing Figures

MOTOR HEATING CONTROL WITH INTERLOCKED DUAL ISOLATING SWITCHES

BACKGROUND OF THE INVENTION

The field of the invention is electrical motor controls, and more particularly, those controls which generate a heating current in motor windings during the time that a motor is at rest and disconnected from its power supply. As illustrated in Blair, U.S. Pat. No. 3,403,239, issued May 20, 1969, a motor heating control package may be connected to two conductors supplying power to a three-phase motor through a motor starter. As described in this patent the heating control circuit selectively couples a motor heating current to the motor after it has been disconnected from its power supply through the opening of the motor starter contacts. The heat generated by this current is said to keep the motor windings at 15°-20° C. above ambient to prevent condensation from forming on the windings. The mechanical features of this arrangement are not described in detail.

As illustrated in Burton et al., U.S. Pat. No. 3,896,353, a mechanical door interlock may be connected between an operating handle on the exterior of an equipment enclosure and a power supply disconnect switch, so that power to a motor starting contactor will be disconnected prior to the opening of an access door on the enclosure. This prior patent also discloses an electromechanical interlock for disabling the operating handle when the motor starting contactor is energized. An earlier motor control of the prior art provided an interlock between an operating handle and the motor starting contactor which required leverage to slide the contactor out of engagement with the plurality of stab connectors. The interlocking of the operating handle to the supply line disconnect switch reduced the mechanical load to be moved through the door interlock. Although this improved door interlock has been provided for motor starting controls, a comparable interlock feature has not been provided in motor heating controls, especially for a motor heating control that could be used to retrofit a motor control center where the customer desires the economy and convenience of retaining an installed motor starter.

SUMMARY OF THE INVENTION

The invention provides a motor heating control that is well suited for retrofit applications in which the control is to be connected between a single-phase power source and an electrical motor that receives power through an existing motor starter. In the invented control unit, a door interlock mechanism is operated when an operating handle is moved to an open position to open two isolating switches within the enclosure, one switch being electrically connected between the motor heating contactor and power supply terminals on the enclosure, and the other switch being electrically connected between the motor heating contactor and the motor heating load terminals on the enclosure.

More particularly, the invention is provided in a motor heating control adapted for connection to a power source and to an electrical motor. The control is housed in an enclosure having an operating handle that is operable between a closed position and an open position in which the door can be opened for access to the interior of the enclosure. First terminal means are provided on the enclosure for connection to the power source and second terminal means are provided on the enclosure for connection to a winding in the electrical motor. Within the enclosure a plurality of current conducting paths are formed between the first terminal means and the second terminal means. A motor heating contactor is mounted within the enclosure and is electrically connected in the current conducting paths to conduct load current when its contacts are closed and to interrupt the load current upon the opening of these contacts. The first isolating switch is electrically connected in the current conducting paths between the motor heating contactor and the first terminal means and the second isolating switch is connected in the current conducting paths between the motor heating contactor and the second terminal means. The door interlock mechanism is provided to connect both of the isolating switches to the enclosure operating handle so that the isolating switches are opened when the handle is moved to its open position prior to opening the door.

The invention provides a motor heating control with both door interlock and non-load break interlock mechanisms.

The invention also provides a motor heating control that can be used with a variety of motor starters that may be encountered in existing installations.

The invention also provides a motor heating control which is installed without breaking into the power distribution lines at facilities with existing motor installations.

The invention also assures disconnection of the motor heating control from the existing motor installation when the door of the motor heating control center is opened.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims for interpreting the scope of the invention.

DETAILED DESCRIPTION OF THE PREFERRED EMBODIMENT

Figure 1:
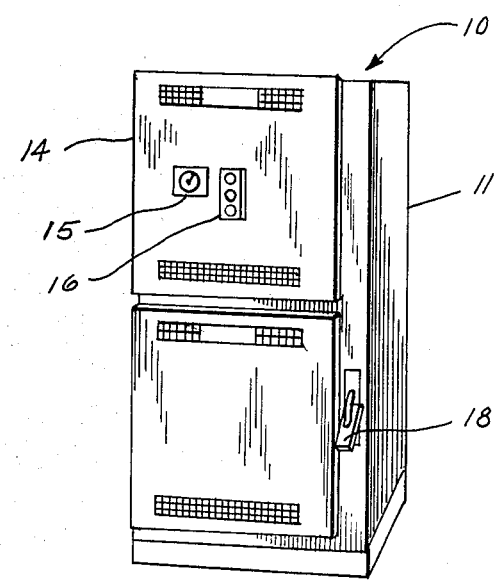
FIG. 1 is a perspective view of the exterior of an enclosure for a motor heating control that incorporates the present invention.

Referring to FIG. 1, the motor heating control center 10 of the present invention is housed in a steel enclosure 11 with upper and lower compartments 12 and 13 (not seen in FIG. 1) enclosed by a double section door 14, the upper section of the door having a gauge 15 and a series of push-button switches and indicator lights 16 mounted thereon for operator control and monitoring of the motor heating control center 10. An operating handle 18 is mounted on the lower-half portion of the enclosure 11 for movement between a closed position and an open position (seen in FIG. 3) to allow opening of the door 14, and in the reverse direction to prevent the door 14 from being opened. The door 14 is held shut by bolts (not shown) and a detent mechanism (not shown) is provided as part of the operating handle 18 to prevent access to the bolts when the handle 18 is in its closed position thereby effectively locking the door 14.

Figure 2:
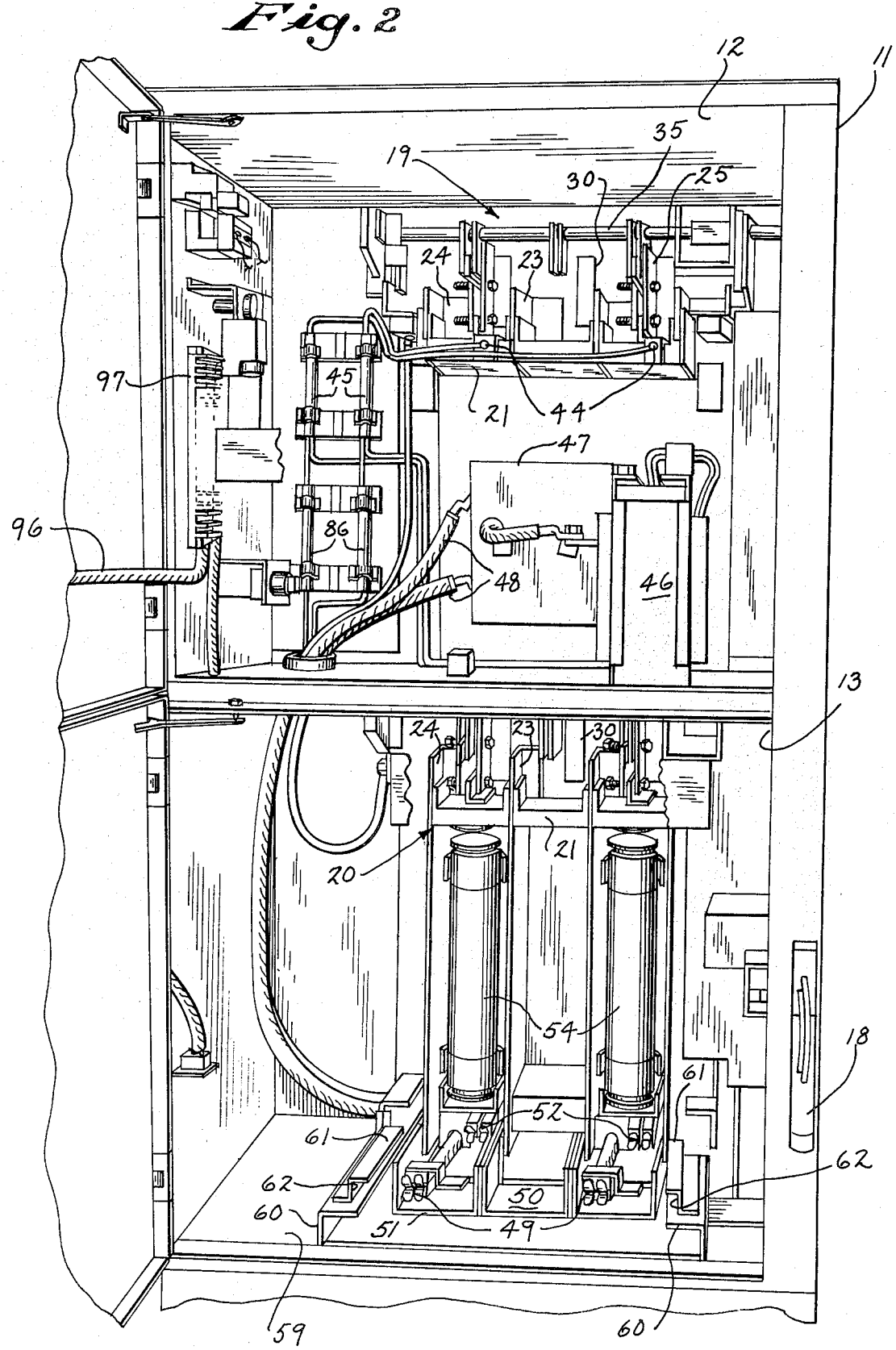
FIG. 2 is a front view of the control of FIG. 1 with the door opened for viewing the interior and with the motor heating contactor removed.
Figure 3:
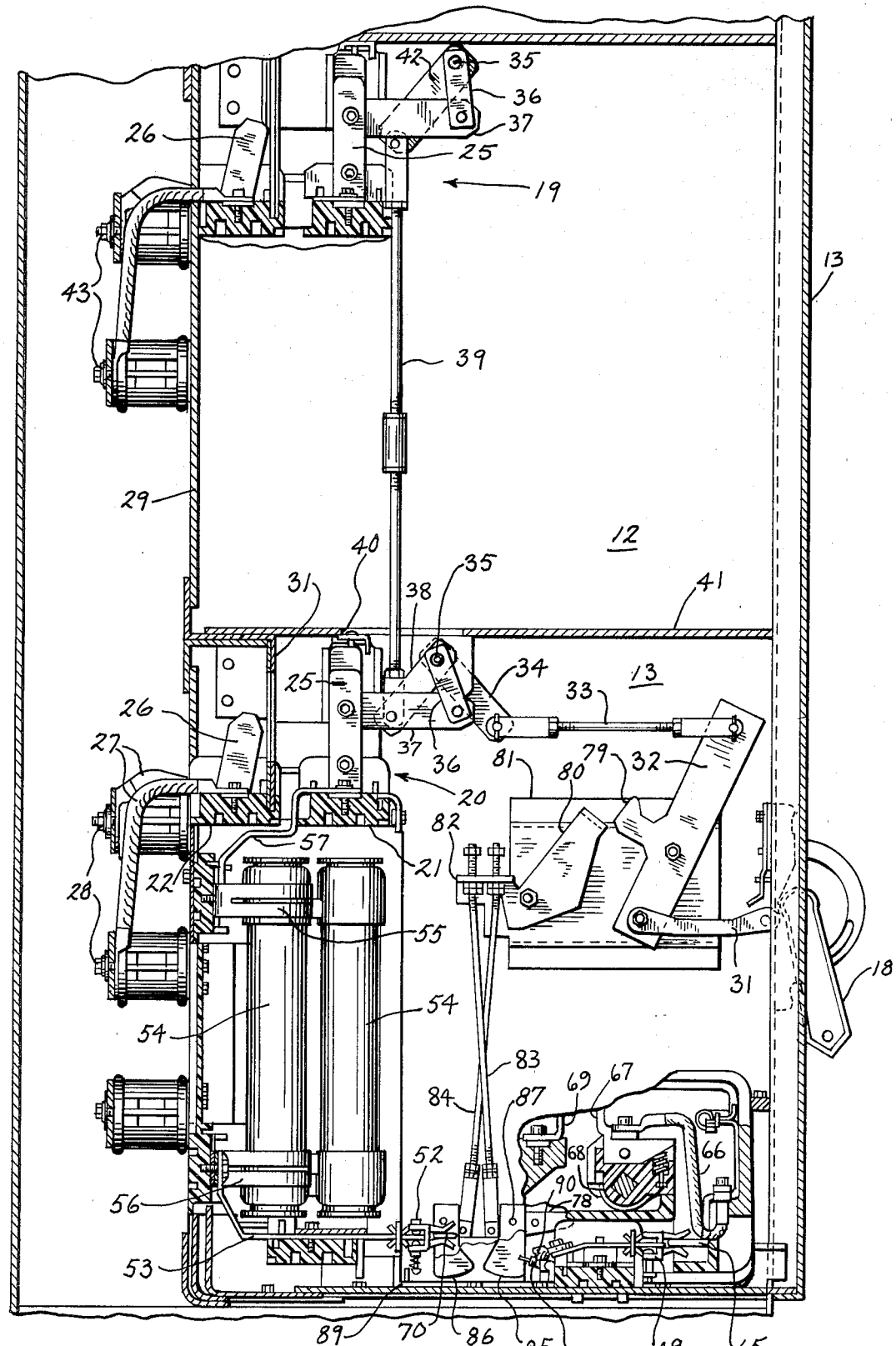
FIG. 3 is a side view of the motor heating control of FIG. 1 with the side wall removed.

Referring to FIGS. 2 and 3, the enclosure 11 houses a first isolating switch 19 in its upper compartment 12 and a second isolating switch 20 in its lower compartment 13. The following description will refer to the lower switch 20, however, these details will be equally applicable to the upper switch 19 as shown by the drawings herein. The lower isolating switch 20 is supported on front and rear support strips 21 and 22 having vertical, spaced barriers 23 between sections that provide three compartments 24 for supporting a three-pole switch. As seen in FIG. 2, the present invention requires only two-pole switches, and therefore movable contacts 25 are pivotably mounted in the compartments 24 on either side of the middle compartment. These doubled-bladed movable contacts 25 are aligned with single blade stationary contacts 26 mounted on the rear support strip 22 in corresponding compartments 24 and connected through cables 27 to insulated terminals 28 on the back of an interior wall 29 of the enclosure 11. The contacts 25 move to engage the stationary contacts 26 through windows 30 in a shutter assembly 31, as more particularly described in Burton et al., U.S. Pat. No. 3,896,353, issued July 22, 1975.

The movement of the operating handle 18 is translated through a switch operating linkage to operate the movable contacts. This linkage includes an actuating link 31 connected to the lower end of a pivot arm 32 that has its upper end connected through a tie rod 33 and crank arm 34 to a drive bar 35 extending transversely above and in front of the movable contacts 25. This drive bar 35 is connected through a switch rocker arm 36 and a thrust arm 37 to each of the movable contacts 25 so that as the pivot arm 32 is moved counterclockwise in FIG. 3 it will produce a clockwise rotation of the drive bar 35 to operate the shutter 31 and cause the movable contacts 25 to swing arcuately downward and over the stationary contacts 26.

Referring to FIG. 3, the isolating switch 19 in the upper compartment 12 is also actuated in response to the movement of the operating handle 18. A second crank arm 38 extends angularly downward from the connection to the first crank arm 34 to a pivotable connection to a vertical switch operating link 39 that extends through an opening 40 in a partition 41 between the two compartments 12 and 13 and upwardly through the first compartment 12 to a pivotal connection to a third crank arm 42, which is oriented similar to the second crank arm 38, but which is positioned in the uper compartment 12 and connects to the drive bar 35 in the upper switch assembly 19. The stationary contacts 26 in the upper switch assembly 19 are connected to a pair of insulated terminals 43 on the back of the equipment support wall 29 that extends along the back of the upper compartment 12. These terminals 43 provide for connection of the motor heating control 10 to a single-phase power source, while the terminals 28 outside the lower compartment 13 provide for connection to a pair of input terminals on a motor.

Figure 6:
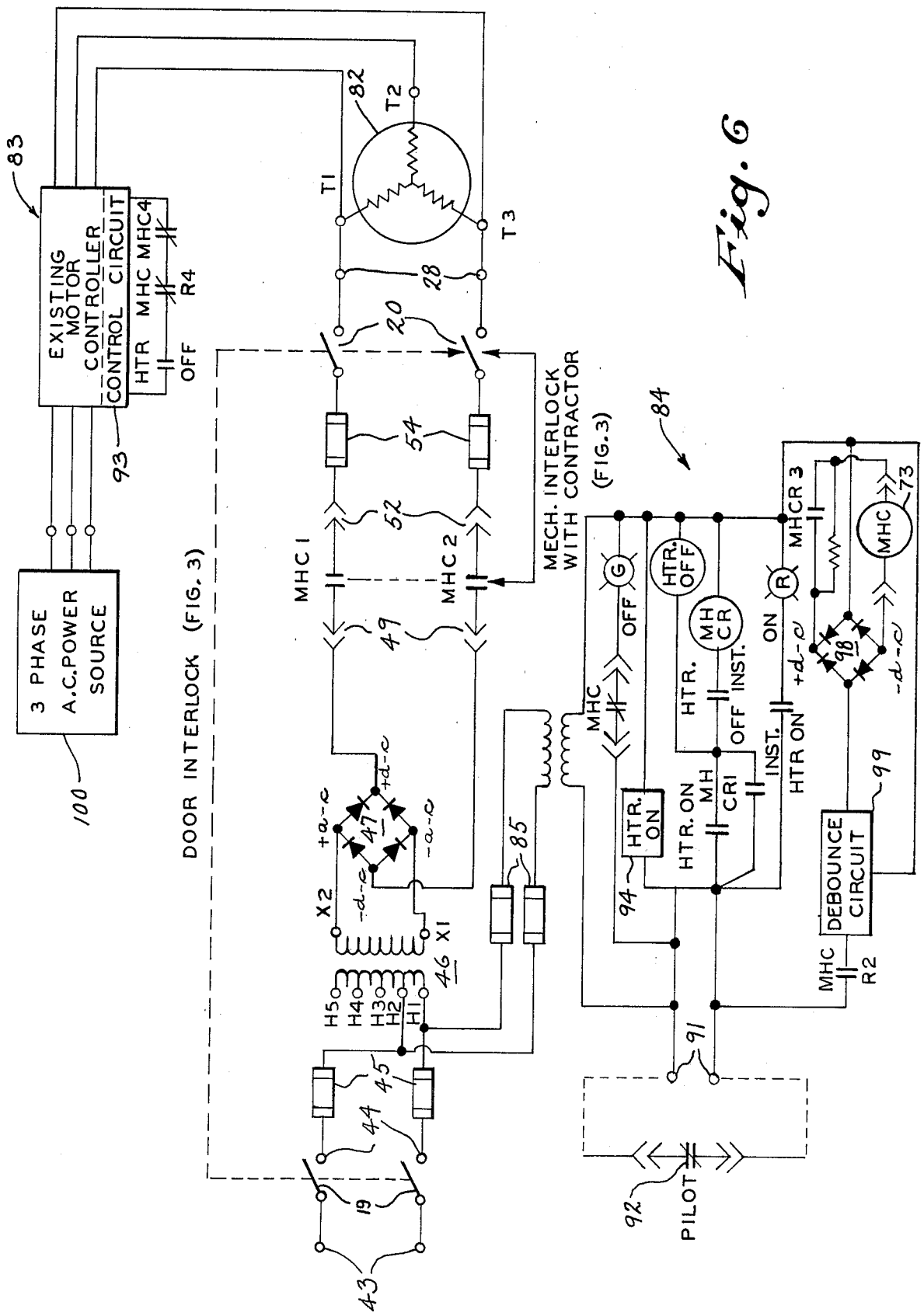
FIG. 6 is an electrical schematic diagram of the motor heating circuit provided by the control of FIG. 1.

Referring to FIGS. 2 and 6, a pair of output terminals 44 on the upper switch assembly 19 are connected through a pair of primary line fuses 45 to a pair of taps H1 and H2 on the primary winding of a transformer 46, which is seen in the uper compartment 12 in FIG. 2. The secondary winding in this transformer 46 is connected through terminals X1 and X2 to a pair of inputs on a full-wave rectifier 47. A pair of fans (not shown) for cooling the rectifier 47 are mounted on its right side of behind the transformer 46 in FIG. 2. A pair of d-c outputs on the rectifier 47 are connected through a pair of large gauge, insulated cables 48 to a pair of contact or input stab connectors 49 in the lower compartment 13 of the enclosure 11. These stab connectors 49 are offset to one side within compartments 50 on an output terminal strip 51 which are on either side of an unoccupied middle compartment 50. To the right of these stab connectors 51 and to the rear of the respective compartments 50 are a pair of contactor output stab connectors 52. Referring to FIG. 3, these are connected through respective input bus bars 53 to large double-barreled contactor fuses 54. Each double-barreled fuse 54 is mounted in tandem with the rear fuse element being held by upper and lower fuse clips 55 and 56, the lower clip 56 being connected to the input bus bar 53 and the upper clip 55 being connected through an output bus bar 57 to a respective movable contact 25 in the lower isolating switch 20.

Figure 4:
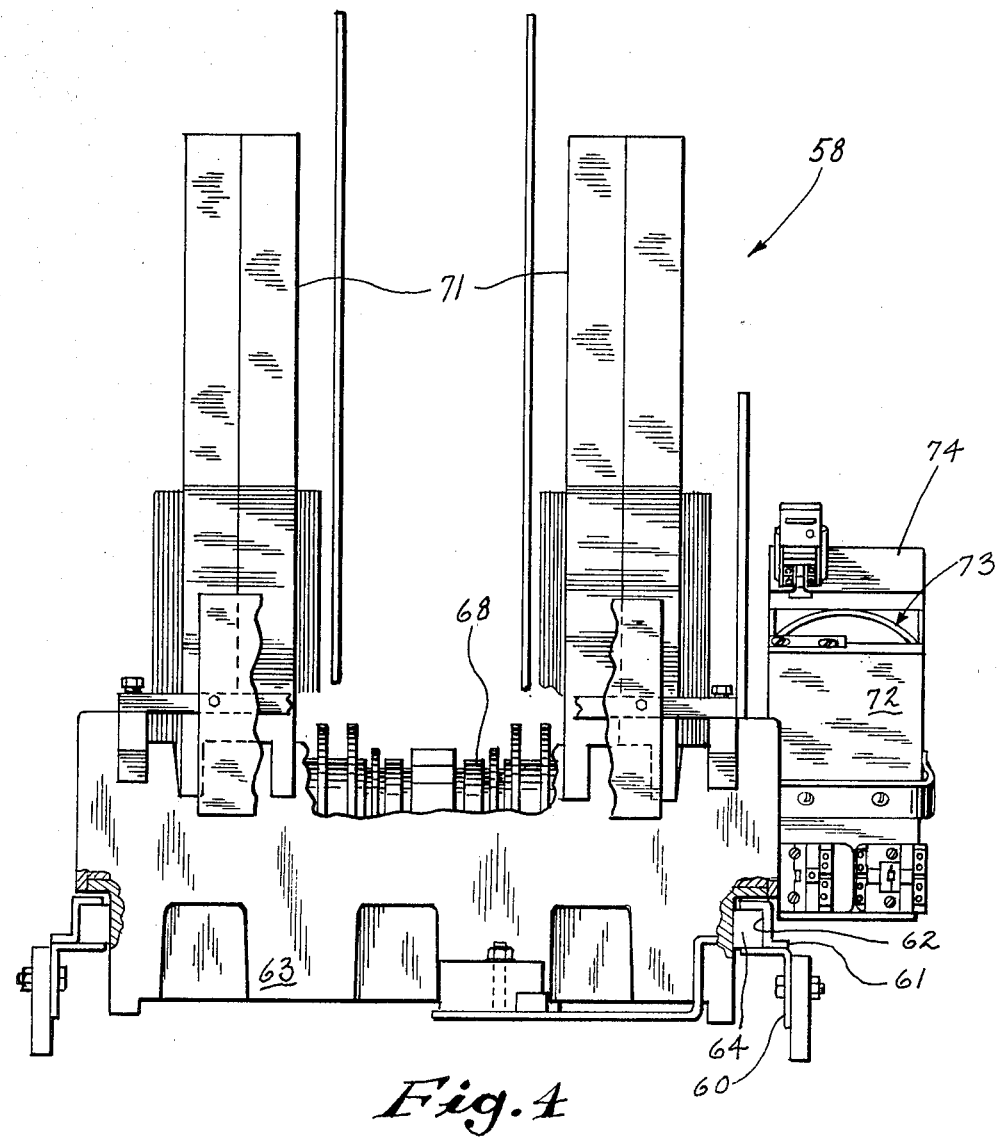
FIG. 4 is a front view of the motor heating contactor unit, which has been removed from FIG. 2.
Figure 5:
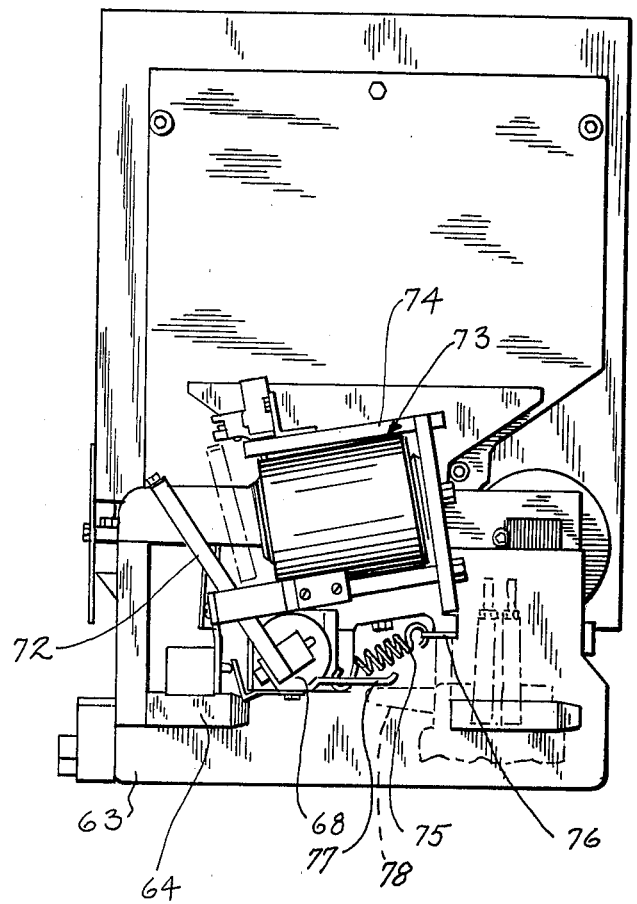
FIG. 5 is a side view of the motor heating contactor unit of FIG. 4 showing a portion of the electromechanical interlock.

Referring to FIGS. 2, 4 and 5, the motor heater contactor 58 in FIG. 4 is mounted in the lower compartment 13 in FIG. 2 and connected to the stab connectors 49 and 52 as follows. On the floor 59 of the lower compartment 12 and on opposite sides of the input terminal strip 51 in FIG. 2 are mounted a pair of brackets 60, and on these brackets 60 are mounted a pair of guide rails 61 which form opposing guideways 62. As seen in FIGS. 4 and 5, the motor heater contactor 58 is supported by a molded carriage base 63 with guide members 64 formed at the front and rear along its sides to be slidably received within the guideways 62. Referring to FIG. 3, the contactor 58 includes stabs 65, which are received in the input stab connectors 49 and which connect through cables 66 to movable contacts 67. These are operated by rotation of a crossbar 68 to engage stationary contacts 69 which are electrically connected to stabs 70 received in the output stab connectors 52. Rising up from the pairs of operating contacts in the two-pole contactor are a pair of arc chutes 71 seen in FIG. 4, and these shield surrounding equipment from arcs, which are cooled and extinguished within the interiors of the chutes 71.

Referring to FIG. 5, the crossbar 68 which carries the movable contacts 67 within the motor heating contactor 58 is coupled at its right end to a pivotable armature plate 72 that moves between an open position and a closed position against the end face of a cylindrical electromagnet 73. The electromagnet 73 is formed by a coil that is wound around a cylindrical core and the magnet assembly also includes a U-shaped yoke 74 extending around the sides and the opposite end of the electromagnet 73. The armature plate 72 is normally biased to its open position by a spring 75 connected between a bracket 76 and a locking bar 77 attached to the lower end of the armature plate 72. As seen in FIG. 5, the pull exerted by the spring 75 tends to pivot the armature plate counterclockwise. When the contactor electromagnet 73 is energized, however, the armature plate 72 is pulled to its closed position and the locking bar 77 presses downward against a lever arm 78 (in phantom).

Referring again to FIG. 3, this lever arm 78 is part of a mechanical interlock for disabling the operating handle 18 in its closed position and with the isolating switches 19 and 20 in their closed, actuated position. The door pivot arm 32 is formed with a hooked tongue 79, and when the pivot arm 32 is moved counterclockwise in FIG. 3, the tongue 79 is in position to be restricted by an interlock catch 80 pivotably mounted on the same support member 81 as the pivot arm 32. The interlock catch 80 has a rear bracket portion 82 which is connected through a pair of connecting rods 83 and 84 that cross in scissors-like fashion. The lower end of the connecting rods 83 and 84 are pivotally connected to cam members 85 and 86. The forward cam member 85 is operated by the locking lever 78 to move pivotably around an axial member 87 and against a bias spring 88 connecting its lower end to a support base 89, until the cam member 88 meets a stop 90 positioned below its lever arm. The clockwise pivoting of the forward cam member 85 causes a reaction by its associated connecting rod 83 to move upward and pivot the interlocking catch 80 into the interlock position. It can thus be seen that the energizing of the electromagnet 73 of FIG. 5 actuates the contacts 67, 69 in the motor heating contactor 58, while at the same time disabling the operating handle 18.

Referring to FIG. 6, the motor heating control of the present invention is connected to a three-phase motor 82 having input terminals T1, T2 and T3 receiving three-phase power through an existing motor controller 83. The output terminals 28 seen in FIG. 3 are connected to input terminals T1 and T3 on the motor 82 so that a motor heating current can be conducted through two windings when the motor 82 is not being supplied with power through the existing motor controller 83. To assure that the power to the motor 82 has been disconnected prior to application of the motor heating current, and to assure disconnection of the motor heating current prior to reconnection of power, a control circuit 84 is provided as seen in FIG. 6. The basic circuit for controlling the energizing of a motor contactor is provided in Publication 1500-5.0 of the assignee of the present invention, dated September, 1976. The description herein is of additional circuit elements and additional functions assigned to the elements of the prior circuit in order to provide a control circuit for selective connection of the motor heating control current to the motor windings.

The control circuit 84 receives power from connections between the primary side fuses 45 and the input terminals H2 and H1 on the transformer 46. The control circuit supply lines are coupled through another pair of fuses 85 to a control circuit transformer 86. A pair of input terminals 91 are provided in one of the control circuit supply lines for connection to a customer's pilot relay contacts 92. These contacts 92 are operated by a pilot relay in a control circuit 93 in the motor controller 83 to provide a connection between these terminals when power is disconnected from the motor 82, and to open the circuit between these terminals 91 when power is supplied to the motor 82.

The circuit 84 includes red (R) and green (G) indicator lights which are also included in the controls 16 mounted on the door 14 in FIG. 1 and, as seen in FIG. 2, are connected through a cable 96 to a terminal block 97. The green light (G) is connected in a first rung of the control circuit 84 in series with a normally closed set of contacts MHC3 that are controlled by the motor heating contactor coil (MHC) 73. As long as the MHC coil 73 is deenergized these contacts are closed and the green light (G) is illuminated to signal that the control center 10 is off. In the next rung of the control circuit 84, in an uppermost branch, a solid state timing relay 94 is connected to receive a supply voltage whenever the pilot relay contacts 92 are closed. The red light (R) is connected in a lowermost branch of this rung in series with a set of instantaneous heater on (INST. HTR. ON) contacts which are part of the relay 94, and which close upon energizing of the relay 94 to illuminate the red light as an indication that the motor heating control center 10 is on.

Referring to the complex middle branch of the second rung in the control circuit 84, a set of heater on delay (HTR ON) contacts from the solid state relay 94 is connected through a first sub-branch to a coil in a heater off delay (HTR OFF) relay. Thus, when the solid state relay 94 is energized, the HTR OFF coil is energized after a time delay, which has been set according to the coast-to-stop time for the motor. The HTR ON contacts are connected in series through a parallel sub-branch to a set of heater instantaneous off (HTR INST OFF) contacts, which are controlled by the HTR OFF coil, and to a coil in a motor heater control relay (MHCR). Thus, the time delayed energizing of the HTR OFF relay coil also energizes the MHCR coil. A first set of contacts MHCR1 controlled by the MHCR coil are connected across the HTR ON DLY contacts, and these are closed with the energizing of the MHCR coil, to allow the HTR ON DLY contacts to drop out or open in preparation for the next "on delay" cycle.

The primary function of the MHCR relay is to control the energizing of the contactor electromagnet 73. Two other sets of contacts MHCR2 and MHCR3 that are controlled by the MHCR coil are connected in the lowermost rung of the control circuit with the motor heater contactor (MHC) coil 73. The MHC coil 73 is connected in series with the MHCR3 contacts across the d-c outputs of a control circuit rectifier 98. One side of the control circuit supply line is connected through the MHCR2 contacts and a debounce circuit 99 to one of the a-c inputs on the rectifier 98. The other side of the a-c supply is connected to the other a-c input on the rectifier 98. Thus, when the MHCR2 and MHCR3 contacts are closed the motor heater contact (MHC) coil is energized with two results. First the MHC1 and MHC2 contacts in the primary motor heating circuit are closed. And second, as explained previously, a mechanical interlock is engaged which disables the operating handle 18, which is the means for opening isolating switches 19 and 20.

When the pilot relay contacts 92 are opened, the MHC coil will be deenergized. The motor heating contacts MHC1 and MHC2 will be opened and the contactor interlock disabled, to reenable operation of the door handle 18. Thus the door 14 cannot be opened when the motor heating contacts are closed, and when the operating handle 18 is moved to its open position the motor heating control center 10 is disconnected from both its power source and the motor.

A set of heater off delay (HTR OFF) contacts as well as a set of normally closed MHCR4 contacts and a set of normally closed MHC4 contacts are connected in series in the control circuit 93 for the motor controller 83 supplying three-phase power to the motor 82. In this way, the MHCR coil and the electromagnet 73 will have been deenergized, followed by a time delay to open the HTR OFF contacts, before power is again supplied to the motor.

It should be apparent from the above description that the motor heating control center 10 of the present invention provides a control of great utility in interfacing motor heating equipment to motors that are part of existing installations. The control center 10 provides complete isolation from both power inputs and motor connections when the door of the enclosure is open. The invention further provides a mechanical interlock that disables the dual switch door interlock when the motor heating contacts are closed. And still further, the invention provides a control center with both on delay and off delay timing in switching the motor to the motor heating supply current and then back to full power.

We claim:

1. A motor heating control for connection to a source of electrical current and to an electrical motor, the control comprising:
   an enclosure having a door and an operating handle that is movable between a closed position and an open position to allow opening of the door for access to the interior of the enclosure;
   first terminal means supported by the enclosure for connection to the power source;
   second terminal means supported by the enclosure for connection to the electrical motor;
   a plurality of current conducting paths formed within the enclosure, to conduct electrical current between the first terminal means and the second terminal means;
   a motor heating contactor disposed within the enclosure, the motor heating contactor having a control coil and having a set of motor heating contacts electrically connected in the current conducting paths, the motor heating contacts being closed to conduct a heating current in response to the energizing of the control coil and the heating current being interrupted upon the opening of the motor heating contacts;
   a first isolating switch electrically connected in the current conducting paths between the motor heating contactor and the first terminal means;
   a second isolating switch connected into the current conducting paths between the motor heating contactor and the second terminal means;
   a first interlock mechanism which connects both of the isolating switches to the enclosure operating handle and which is operable to open the two isolating switches when the handle is moved to its open position; and
   a second interlock mechanism coupled to the motor heating contactor and cooperable with the first interlock mechanism in response to the closing of the motor heating contacts to prevent movement of the operating handle until the motor heating contacts are opened.

2. The motor heating control of claim 1, wherein the operating handle is connected to a transverse drive bar in the second isolating switch through the door interlock mechanism, and wherein the door interlock mechanism includes crank arms connected to transverse drive bars in the first and second isolating switches, respectively, and also includes a vertical link connecting these crank arms so that the drive bar in the first isolating switch will be operated at the same time as the drive bar in the second isolating switch.

3. The motor heater control of claim 1, further comprising:
   a step-down transformer electrically connected into the current conducting paths with primary winding terminals connected to receive electrical current through the first isolating switch and with secondary winding terminals; and
   a rectifier connected in the current conducting paths between the secondary winding terminals of the step-down transformer and the motor heating contactor for receiving a-c current from the transformer and generating d-c motor heating current to the motor heating contactor.

4. The motor heater control of claim 3, wherein there are two current conducting paths, wherein the first isolating switch has two poles for coupling single-phase a-c electrical current to the step-down transformer, wherein single phase a-c electrical current is output from the secondary winding terminals of the transformer and received by the rectifier, and wherein the second isolating switch has two poles for coupling the d-c motor heating current from the rectifier to the second terminal means when the motor heating contacts are closed.

5. A motor heating control for connection to a source of heating current and for connection to an electrical motor being supplied with power from a three-phase power source through an existing motor starter, the heating control comprising:
   an enclosure having a door and an operating handle that is movable between a closed position and an open position to allow opening of the door for access to the interior of the enclosure, the enclosure also having an interior wall facing the door;
   a pair of power terminals mounted on the back side of the interior wall;
   a pair of motor heating load terminals mounted on the back side of the interior wall below the power terminals;
   a first isolating switch disposed within the enclosure and connected to the power terminals;
   a motor heating conductor disposed within the enclosure, the motor heating contactor having a pair of inputs coupled to receive a motor heating current from the first isolating switch and having a pair of outputs to which the motor heating current is conducted through a set of motor heating contacts when the contactor is energized;
   a second isolating switch disposed within the enclosure and connected between the outputs of the motor heating contactor and the motor heating load terminals;
   a door interlock mechanism which connects the two isolating switches to the enclosure operating handle and which is operable to open the two isolating switches when the handle is moved to its open position; and
   a contactor interlock mechanism adjacent the motor heating contactor and cooperable with the first interlock mechanism in response to the closing of the motor heating contacts to prevent operation of the operating handle and to maintain closure of the isolating switches until the motor heating contacts are opened.

6. The motor heating control of claim 5, wherein the operating handle is connected to a transverse drive bar in the second isolating switch through the door interlock mechanism, and wherein the door interlock mechanism includes crank arms connected to transverse drive bars in the first and second isolating switches, respectively, and also includes a vertical link connecting these crank arms so that the drive bar in the first isolating switch will be operated at the same time as the drive bar in the second isolating switch.

* * * * *